United States Patent [19]

Reiter

[11] 3,994,388

[45] Nov. 30, 1976

[54] CONVEYOR BELT CLEANER

[75] Inventor: Robert C. Reiter, Aurora, Ill.

[73] Assignee: Material Control, Inc., Aurora, Ill.

[22] Filed: Aug. 29, 1975

[21] Appl. No.: 609,028

[52] U.S. Cl. ............................................ 198/499
[51] Int. Cl.² .......................................... B65G 45/00
[58] Field of Search ............ 198/230, 229; 267/152, 267/166; 15/256.5

[56] References Cited
UNITED STATES PATENTS

| 704,977 | 7/1902 | Taylor | 198/230 UX |
|---|---|---|---|
| 928,730 | 7/1909 | Bausman | 198/230 X |
| 2,305,484 | 12/1942 | Merchen | 198/230 X |
| 2,398,821 | 4/1946 | Davidson | 198/230 |
| 2,794,540 | 6/1957 | Sinden | 198/230 |
| 3,082,028 | 3/1963 | Werle | 267/152 X |
| 3,101,837 | 8/1963 | Martin | 198/230 |
| 3,315,794 | 4/1967 | Ellington | 198/230 |
| 3,674,131 | 7/1972 | Matson | 198/230 |
| 3,795,308 | 3/1974 | Oury | 198/230 |

Primary Examiner—Johnny D. Cherry
Assistant Examiner—Richard K. Thomson
Attorney, Agent, or Firm—Cullen, Settle, Sloman & Cantor

[57] ABSTRACT

The conveyor belt cleaner serves as a mechanical cleaner for an endless conveyor belt entrained about a pair of drums and includes a plurality of independently operable scraper or wiper blade assemblies for removing from the conveyor belt various types of abrasives and other objectionable foreign material. Each scraper blade assembly includes an elongated arm or lever which is pivotally mounted on a pivot pin of a bracket assembly. The scraper blade is secured to one end of the arm and is located at one side of the pivot pin. An adjustable stop is interposed between the bracket assembly and the arm at the other side of the pivot pin to limit the pivotal movement of the arm in one direction. A compression spring is interposed between the bracket assembly and the arm at said one side of the pivot pin for urging the arm in said one direction to bias the scraper blade, secured to one end of the arm, towards the belt. As the blade wears, the compression spring pivots the arm and continues to bias the blade towards the belt, with the pivoting of the arm being limited by the adjustable stop.

13 Claims, 6 Drawing Figures

CONVEYOR BELT CLEANER

BACKGROUND OF THE INVENTION

1. Field of the Invention

A conveyor belt cleaner for an endless conveyor belt trained about a pair of rollers which comprises a plurality of independently operable scraper blade assemblies for removing, from the conveyor belt abrasive and/or foreign materials. Because of the tendency of the belt to accumulate adhering material, it is commonplace to provide beneath the return strand of the belt a plurality of scraper blades to remove this material.

2. Description of the Prior Art

My U.S. Pat. No. 3,342,312 dated Sept. 19, 1967, discloses a mechanical cleaner assembly mounted underneath the return run or strand of the conveyor belt and subjected primarily to bending and torsional forces. The cleaner includes a plurality of torsion springs or arms, each arm operating independently of the other. One end portion of each torsion arm is fixedly connected to the supporting frame and the other end portion, which is free, is provided with a reversible wiper blade which is engageable with a conveyor belt to clean and wipe the abrasive material therefrom.

U.S. Pat. No. 3,656,610 of Michael R. McWilliams, dated Apr. 18, 1972, assigned to the assignee of record, discloses a plurality of independently operable spring-wiper blade assemblies including spring or torsion arms which are mounted on a support structure by means of a resilient mounting structure which absorbs vibration and shock and thereby minimizes fatigue and breakage of the spring arms.

U.S. Pat. No. 3,504,786 of Carl G. Matson, dated Apr. 7, 1970, discloses a conveyor belt cleaner including a plurality of blade-torsion arms assemblies of the aforementioned type, with the blades arranged diagonally of the length of the run in overlapping echelon fashion so as to cause the scraped material to be directed toward a discharge at one end of the run.

U.S. Pat. No. 3,598,231 of Carl G. Matson, dated Aug. 10, 1971, discloses a conveyor belt cleaner having a plurality of elongated torsion arms, with each arm attached to a support so that each arm is rockable relative to the support and relative to the other arms generally about the length of the support.

U.S. Pat. No. 2,794,540 of Alfred D. Sinden, dated June 4, 1957, discloses a belt cleaner in which leaf springs are provided for the wiper blades.

Each of the prior art patents noted previously utilizes a plurality of torsion or leaf springs or arms for carrying the wiper blades. It has been found that a torsion spring will have a long life but cannot be made uniformly. A leaf spring can be made uniformly but does not have as long a life in a belt cleaning application as a torsion spring.

SUMMARY OF THE INVENTION

The present invention has certain economical and functional advantages over the prior art patents incorporating torsion or leaf springs or arms. The belt cleaner of the present invention includes a plurality of scraper blade assemblies secured to a support for independent movement, with each assembly comprising an elongated arm adapted to be disposed lengthwise of the endless belt and having a scraper blade secured on one end thereof which is adapted to engage and is disposed transversely of one run of the belt. Each scraper blade assembly also includes a bracket assembly or a support bracket secured to the support. Each arm is pivotally mounted on a pivot pin carried by the support bracket. The blade is secured to one end of the arm and is located at one side of the pivot pin. Adjustable stop means is interposed between the support bracket and the arm at the other side of the pivot pin to limit the pivotal movement of the arm in one direction. A compression spring is interposed between the support bracket and the arm on the said side of the pivot pin as the wiper blade for urging the arm in said one direction and biasing the blade towards one run of the belt. The advantage of the present invention over the prior art is in the use of a pivotally mounted arm and on a compression spring for biasing the arm in a direction to urge the blade towards the belt and to thereby compensate for any wear occurring in the wiper blade. It is found that a compression spring has an advantage over torsion or leaf springs in that the compression spring combines a long life and uniformity in a belt cleaning application.

DESCRIPTIONS OF PREFERRED EMBODIMENTS

Figure 1:
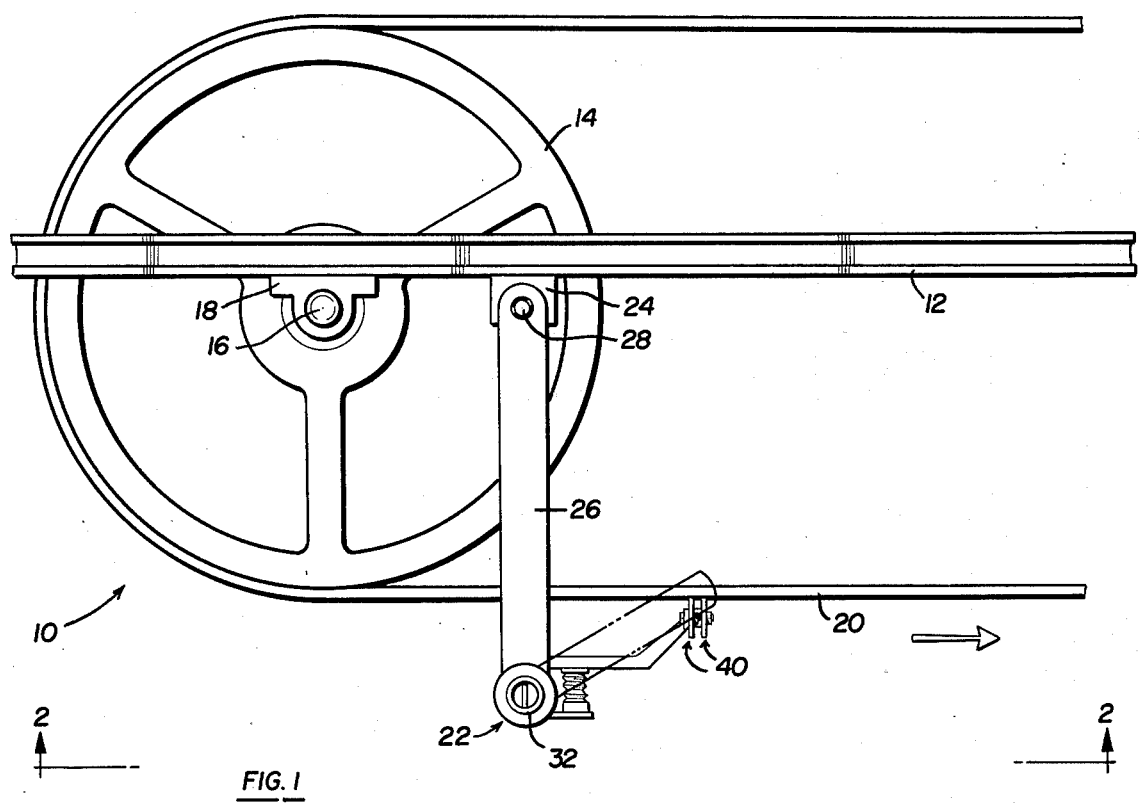
FIG. 1 is a fragmentary side view of the belt conveyor and of the mechanical cleaner therefor, with the cleaner mounted beneath the return strand or run of the conveyor belt and in an operative position.
Figure 2:
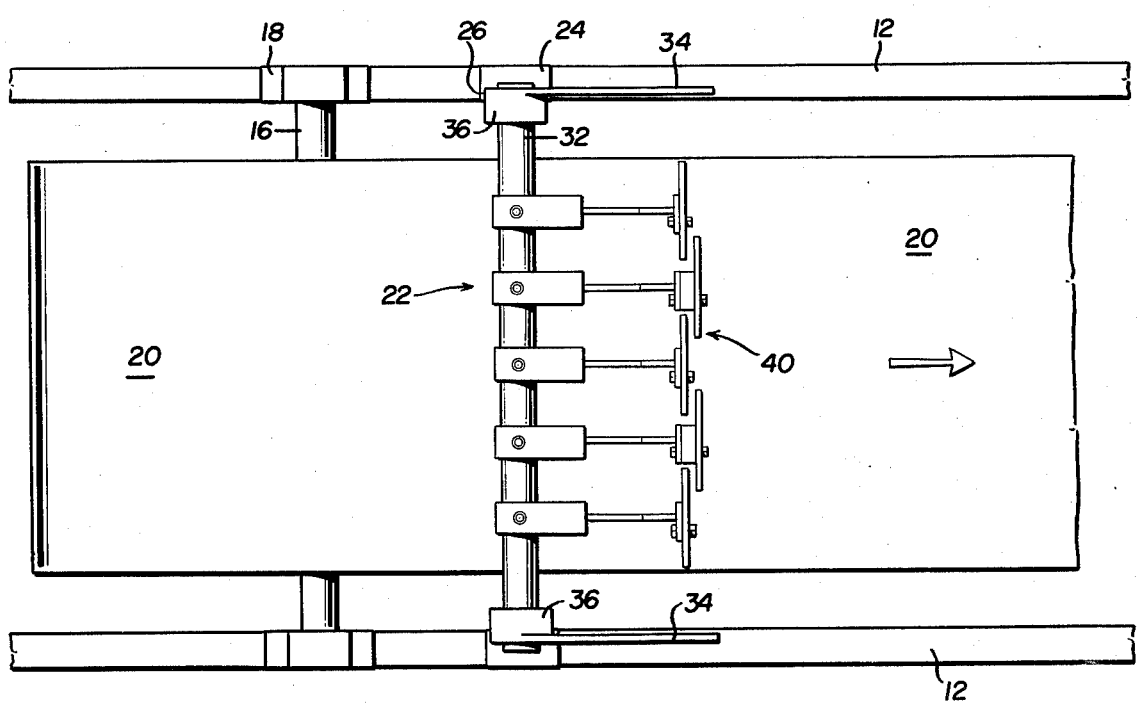
FIG. 2 is a fragmentary bottom view of the belt conveyor and cleaner illustrated in FIG. 1.

The conveyor illustrated in FIGS. 1 and 2 is designated by the numeral 10 and includes a frame 12 which supports a pair of pulleys or rollers, the head pulley or roller being designated by the numeral 14. The roller 14 is mounted on a shaft 16 which is supported by lugs or bearings 18 carried by the frame 12. Wrapped around the rollers is an endless conveyor belt 20. The life of the belt 20 may be extended by removing therefrom abrasive or foreign materials whether wet, dry or sticky. The belt 20 is cleaned by means of a mechanical belt cleaner designated by the numeral 22 in FIGS. 1 and 2.

The mechanical belt cleaner 22 includes a mounting assembly for locating the cleaner 22 beneath the return run of the belt as shown in FIGS. 1 and 2. The mounting assembly comprises a pair of hanger clips 24, one at each side of frame 12 (FIG. 2), secured and fastened to the frame 12 by bolts or other means not shown. A hanger 26 is connected to each bracket 24 by means of a pin connection 28. The hangers 26 are located at opposite sides of the conveyor belt 20 and arranged generally vertically as illustrated in FIG. 1.

The assembly further includes a transversely extending tube or tubular support 32 underneath the return strand of the belt 20 and spaced therefrom as illustrated in FIG. 1. Operating levers or handles 34 provided with sleeve portions 36 at one end thereof are provided on opposite ends of the tubular support 32 (FIG. 2). The levers or handles 34 assist in the positioning of the wiper or scraper blade assemblies 40 for proper blade pressure and other adjustments as is well known in the art.

The tubular support 32, as noted in FIG. 2, is provided with a plurality of transversely spaced apart scraper blade assemblies 40 which are arranged in parallel. Each scraper blade assembly 40, as noted in FIGS. 3–5 inclusive, includes an elongated arm 42, a wiper blade 44, a support bracket or bracket assembly 46, a compression spring 50 and other component parts to be subsequently identified.

Arm 42 is made from steel, is generally straight when viewed from the top or bottom as noted in FIG. 2, is of uniform thickness and is of rectangular configuration throughout its longitudinal extent. The arm 42, when viewed from the side as noted in FIG. 4, includes an elongated relatively straight portion 50 and a shorter portion 52 which is inclined upwardly at an angle with respect to the straight portion 50. The inclined arm portion 52 provided at one end of arm 42 is provided with a flange 54 bent at a right angle thereto. The wiper or scraper blade 44 is secured to one end of the arm 42 by means of a bolt 56 which extends through an opening provided in the flange 54 and in the wiper blade 44. A nut 58 is threaded onto the bolt 56 to secure the wiper blade to the arm 42.

Figure 6:
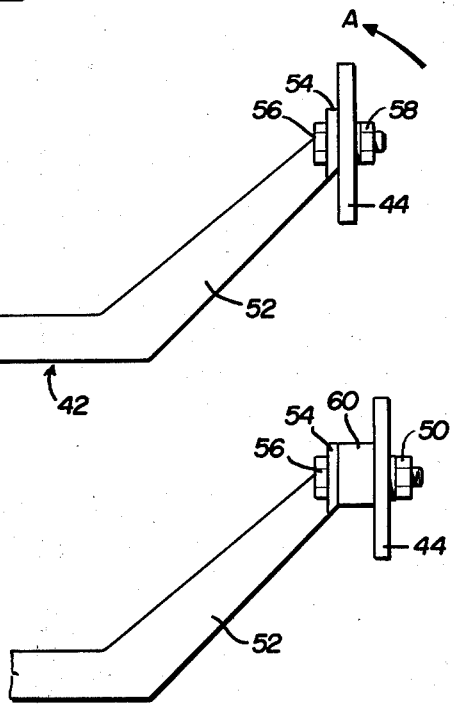
FIG. 6 is a fragmentary side elevational view of the wiper blade end of an arm of the cleaner.

As noted in FIG. 2, the wiper blade asemblies 40 are mounted on the support 32 in overlapping relation. In order to accomplish same, it is necessary that the blades 44 of adjacent assemblies 40 be offset one from the other so that the blades 44 will not strike one another. This is accomplished, as an example, as shown in FIG. 6 by utilizing a tubular spacing element 60 which is interposed between the arm flange 54 and the wiper blade 44. The bolt 56 thus extends through the openings provided in the arm flange 54, spacer 60 and wiper blade 44.

Figure 4:
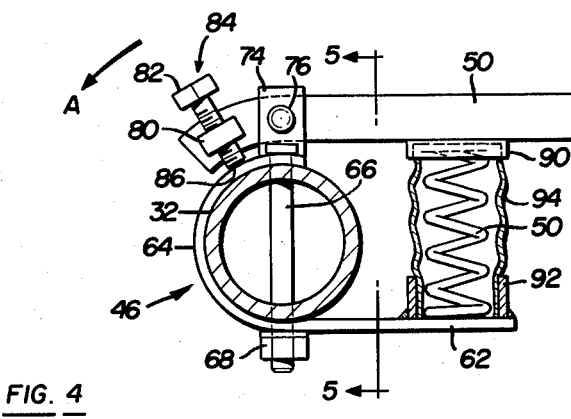
FIG. 4 is a side elevational view, partly in section, of the scraper blade assembly illustrated in FIG. 3.

The support bracket or bracket assembly 46 has an elongated generally horizontal leg 62, having at one end thereof a semicylindrical or curved "C" shaped portion 64 engageable with and seated on the tubular support 32. The support bracket 46 is secured to the tubular support 32 by means of a bolt 66 and a nut 68 as best illustrated in FIG. 4. Bolt 66 extends through aligned openings provided in the curved portion 64 of the support bracket 46 and in the tubular support 32, with the nut 68 being threaded to the bolt 66 to maintain the curved portion 64 in close contact with the tubular support 32.

Figure 3:
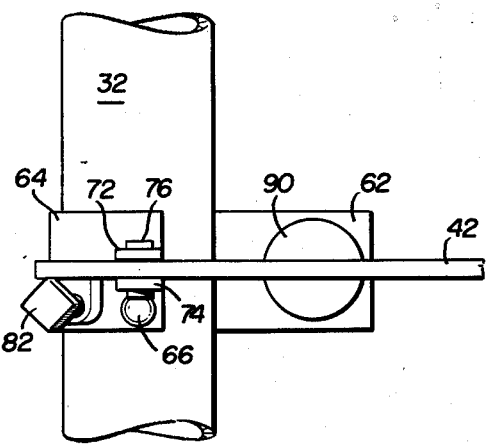
FIG. 3 is a fragmentary top view of one scraper blade assembly mounted on a support.
Figure 5:
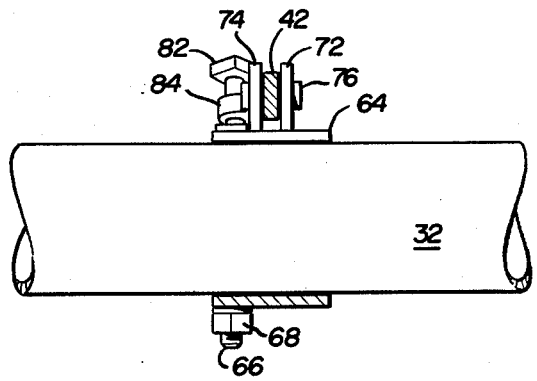
FIG. 5 is an elevational view of the scraper blade assembly, partly in section, looking in the direction of arrows 5—5 of FIG. 4.

The bracket support 46 further includes a pair of upstanding vertical ears 72, 74 which are spaced apart and through which the arm 42 extends as best illustrated in FIGS. 3–5 inclusive. Openings are provided in the ears 72, 74 and in the arm 42 for the reception of a pivot pin 76.

The other end of the arm 42 remote from the wiper blade 44 carries at one side thereof a threaded nut 80 which in turn adjustably carries a threaded bolt 82 forming an adjustable stop 84. The inner end of the bolt 82 has a stop surface 86 which is adapted to engage the curved portion 64 of the support bracket 46.

The compression spring 50 is located on the same side of the pivot pin 76 as is the wiper blade 44 as best shown in FIG. 4. The spring 50 is interposed between the horizontal arm 62 of the support bracket 46 and the arm 42. A ringlike element or holder 90 is welded or otherwise secured to the bottom of the arm 42. A tubular holder or element 92 is secured to the top surface of the leg 62. An expandable bellows 94 is interposed between the holders 90, 92 and provides a dust shield for the spring 50 which is located inside of the bellows 94 as best shown in FIG. 4.

The compression spring 50 is effective to urge the arm 42 about the pivot pin 76 in the direction indicated by arrows A in FIG. 4. In order to limit the amount of pivotal movement of the arm 42 by the spring 50, the scraper blade assembly 40 includes the adjustable stop 84. The adjustable stop 84 and spring 50 are located on opposite sides of the pivot pin 76, with the spring 50 and wiper blade 44 being located on the same side of the pivot pin 76.

As the wiper blade 44 wears, the spring 50 urges or biases the blade 44 against the belt 20, provided the arm 42 is not limited from rotation by the adjustable stop 84. Adjustment of the stop 84 in one direction will permit an increase in travel of the arm 42, while adjustment of the stop 84 in the opposite direction will result in a decrease in travel of the arm 42. As the blade 44 wears, the stop bolt 82 would be rotated in a direction to permit the arm 42 to pivot through a greater distance, thus compensating for the height of the blade 44.

What is claimed is:

1. A scraper blade assembly for a belt cleaner mounted on a conveyor having a rotatable drum and an endless belt trained about the drum and providing delivery and return runs, with the belt cleaner including a support fixedly located transversely of and adjacent to one of the runs, said scraper blade assembly comprising an elongated arm adapted to be disposed lengthwise of said one run and having a scraper blade secured on one end thereof which is adapted to engage and to be disposed transversely of said one run, and a support bracket adapted to engage and to be secured to the support, pivot means rotatably mounting said arm on said support bracket, said scraper blade being located at one side of said pivot means, stop means interposed between said bracket and said arm at the opposite side of said pivot means to limit the movement of said arm in one direction about said pivot means, and compression spring means coupled between said bracket assembly and an intermediate portion of said arm at said one side of said pivot means for urging said arm in said one direction about said pivot means to bias said blade towards said one run.

2. The scraper blade assembly defined in claim 1 wherein said pivot means is in the form of a pivot pin extending through an intermediate portion of said arm, with the end portions of said pivot pin being carried by said bracket.

3. The scraper blade assembly defined in claim 1 wherein said stop means is carried by said arm, said stop means being adjustable.

4. The scraper blade assembly defined in claim 3 wherein said stop means is in the form of a threaded bolt and nut, said nut being secured to said elongated arm and said bolt being adjustably carried by said nut with the leading end on said bolt engageable with said bracket.

5. The scraper blade assembly defined in claim 1 wherein said compression spring means is a compression spring having one end secured to said intermediate portion of said arm and the opposite end thereof secured to said bracket.

6. The scraper blade assembly defined in claim 5 wherein said compression spring is enclosed by a flexible dust shield.

7. The scraper blade assembly defined in claim 6 wherein said flexible dust shield is in the form of an expandable bellows having one end secured to said elongated arm and the other end secured to said bracket.

8. The scraper blade assembly defined in claim 1 wherein said bracket includes a generally C-shaped portion adapted to engage the support, said C-shaped portion being located at the end of a generally straight leg portion paralleling said arm, and a pair of spaced apart ears between which said arm extends, said pivot means extending through said arm and said ears.

9. The scraper blade assembly defined in claim 8 wherein said stop means is in the form of a threaded bolt and nut, said nut being secured to said arm and said bolt being adjustably carried by said nut, with the leading end on said bolt engageable with said bracket.

10. The scraper blade assembly defined in claim 8 wherein said compression spring means is a compression spring having one end engageable with said intermediate portion of said arm and the opposite end thereof engageable with said bracket.

11. The scraper blade assembly defined in claim 9 wherein said compression spring means is a compression spring having one end engageable with said intermediate portion of said arm and the opposite end thereof engageable with said bracket.

12. The scraper blade assembly defined in claim 8 wherein said compression spring is enclosed by a flexible dust shield.

13. The scraper blade assembly defined in claim 12 wherein said flexible dust shield is in the form of an expandable bellows having one end secured to said elongated arm and the other end secured to said bracket.

* * * * *